US012669994B2

(12) United States Patent
    K M

(10) Patent No.: US 12,669,994 B2
(45) Date of Patent: Jun. 30, 2026

(54) PHYSICAL NODE OPTIMIZER IN A CONTAINERIZED APPLICATION MANAGEMENT SYSTEM

(71) Applicant: Dell Products L.P., Round Rock, TX (US)

(72) Inventor: Naga Chetan K M, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 228 days.

(21) Appl. No.: 18/329,000

(22) Filed: Jun. 5, 2023

(65) Prior Publication Data

US 2024/0403032 A1 Dec. 5, 2024

(51) Int. Cl.
    *G06F 8/70* (2018.01)

(52) U.S. Cl.
    CPC ...................................... *G06F 8/70* (2013.01)

(58) Field of Classification Search
    CPC ........... G06F 8/5803; G06F 2009/4557; G06F 2009/45575; G06F 8/60; G06F 8/61; G06F 8/714
    See application file for complete search history.

(56) References Cited

U.S. PATENT DOCUMENTS

| | | | | |
|---|---|---|---|---|
| 11,132,241 B2 * | 9/2021 | Caldato | ............... | G06F 11/3644 |
| 11,323,327 B1 * | 5/2022 | Chitalia | ................. | H04L 63/102 |
| 2019/0102226 A1 * | 4/2019 | Caldato | ................. | G06F 9/5083 |
| 2019/0278497 A1 * | 9/2019 | Yu | ......................... | G06F 9/4418 |
| 2020/0042608 A1 * | 2/2020 | Gahlot | ................... | G06F 16/182 |
| 2020/0073656 A1 * | 3/2020 | Satapathy | ................. | G06F 8/71 |
| 2022/0116289 A1 * | 4/2022 | Ramanathan | ....... | H04L 41/5051 |
| 2022/0334886 A1 * | 10/2022 | Vishwanath | ........ | G06F 11/3433 |
| 2023/0107891 A1 * | 4/2023 | Miriyala | ............. | G06F 9/45558 370/254 |
| 2024/0403118 A1 * | 12/2024 | Wang | .................... | G06F 9/5094 |

OTHER PUBLICATIONS

"Kubernetes API Aggregation Layer" Oct. 8, 2022. Web accessed May 31, 2023: https://kubernetes.io/docs/concepts/extend-kubernetes/api-extension/apiserver-aggregation/.

(Continued)

*Primary Examiner* — Wei Y Mui
*Assistant Examiner* — Brahim Bourzik
(74) *Attorney, Agent, or Firm* — Amin, Turocy & Watson, LLP

(57) ABSTRACT

The described technology is generally directed towards minimizing energy requirements of nodes/servers during periods of low resource usage by collection of pods deployed on the nodes. An application can be deployed on a set of nodes via a set of pods. During a period(s) of low application resource requirement, a subset of the available nodes can be powered down to reduce the operational overhead/energy consumption of the set of nodes. Prior to powering down, any pods operating of the subset of nodes can be redeployed to nodes that are to remain powered, thereby freeing up the subset of nodes to be powered down. Operation of the subset of powered nodes can be monitored to determine the pods exerting operational pressure on the resources, whereby the subset of nodes currently powered down can be powered up to make their resources available to reduce the operational pressure of the pods.

20 Claims, 10 Drawing Sheets

(56) References Cited

OTHER PUBLICATIONS

"Configure the Aggregation Layer" May 19, 2023 Web accessed May 31, 2023: https://kubernetes.io/docs/tasks/extend-kubernetes/configure-aggregation-layer/.

"Set up an Extension API Server" Jul. 21, 2022. Web accessed May 31, 2023: https://kubernetes.io/docs/tasks/extend-kubernetes/setup-extension-api-server/.

Jiang, et al., "An energy-aware virtual machine migration strategy based on three-way decisions," Energy Reports, Nov. 2021, pp. 8597-8607, vol. 7, Elsevier, https://doi.org/10.1016/j.egyr.2021.02.029.

Choudhary et al., "A critical survey of live virtual machine migration techniques," Journal of Cloud Computing, Published: Nov. 7, 2017, the entire document, vol. 6, article No. 23, (2017), Springer Nature, DOI 10.1186/s13677-017-0092-1.

\* cited by examiner

200A

RESOURCE % USAGE =
BELOW THRESHOLD

DRAIN 160A = REDEPLOY
PODS 130A-D

POWER DOWN NODE 120A

RESOURCE % USAGE =
ABOVE THRESHOLD
(PRESSURED)

RESTART 160B =
REDEPLOY PODS 130A-n

POWER UP NODE 120A

200B

310 — CONVERT AN APPLICATION TO A MICROSERVICE COMPRISING A GROUP OF PODS

320 — DEPLOY PODS ON A SET OF NODES

330 — MONITOR OPERATION OF THE NODES

340 — IS OPERATION BELOW A THRESHOLD?    NO

YES

350 — REDEPLOY PODS TO SUBSET OF NODES

360 — POWER DOWN THE UNUSED NODES

370 — MONITOR OPERATION OF THE NODES

380 — IS OPERATION ABOVE A THRESHOLD?    NO

YES

390 — POWER UP DORMANT NODES

395 — REDEPLOY THE PODS ACROSS THE SET OF NODES

410 — REVIEW HISTORICAL DATA REGARDING RESOURCE USAGE

420 — IS PATTERN DISCERNIBLE?

430 — MONITOR FURTHER

NO

YES

440 — DETERMINE A POWER DOWN EVENT AND A POWER UP EVENT

450 — SCHEDULE THE POWER DOWN EVENT AND THE POWER UP EVENT

460 — IN ACCORDANCE WITH SCHEDULE, REDEPLOY PODS AND POWER DOWN NODE(S)

470 — IN ACCORDANCE WITH SCHEDULE, REDEPLOY PODS AND POWER UP DORMANT NODE(S)

400

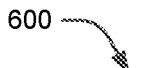
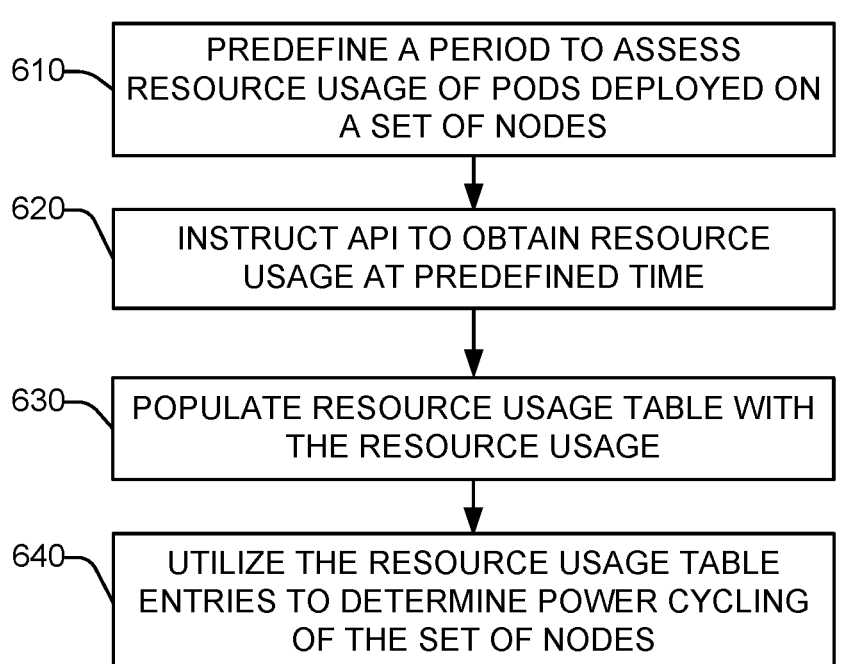
610 — PREDEFINE A PERIOD TO ASSESS RESOURCE USAGE OF PODS DEPLOYED ON A SET OF NODES
620 — INSTRUCT API TO OBTAIN RESOURCE USAGE AT PREDEFINED TIME
630 — POPULATE RESOURCE USAGE TABLE WITH THE RESOURCE USAGE
640 — UTILIZE THE RESOURCE USAGE TABLE ENTRIES TO DETERMINE POWER CYCLING OF THE SET OF NODES
FIG. 6

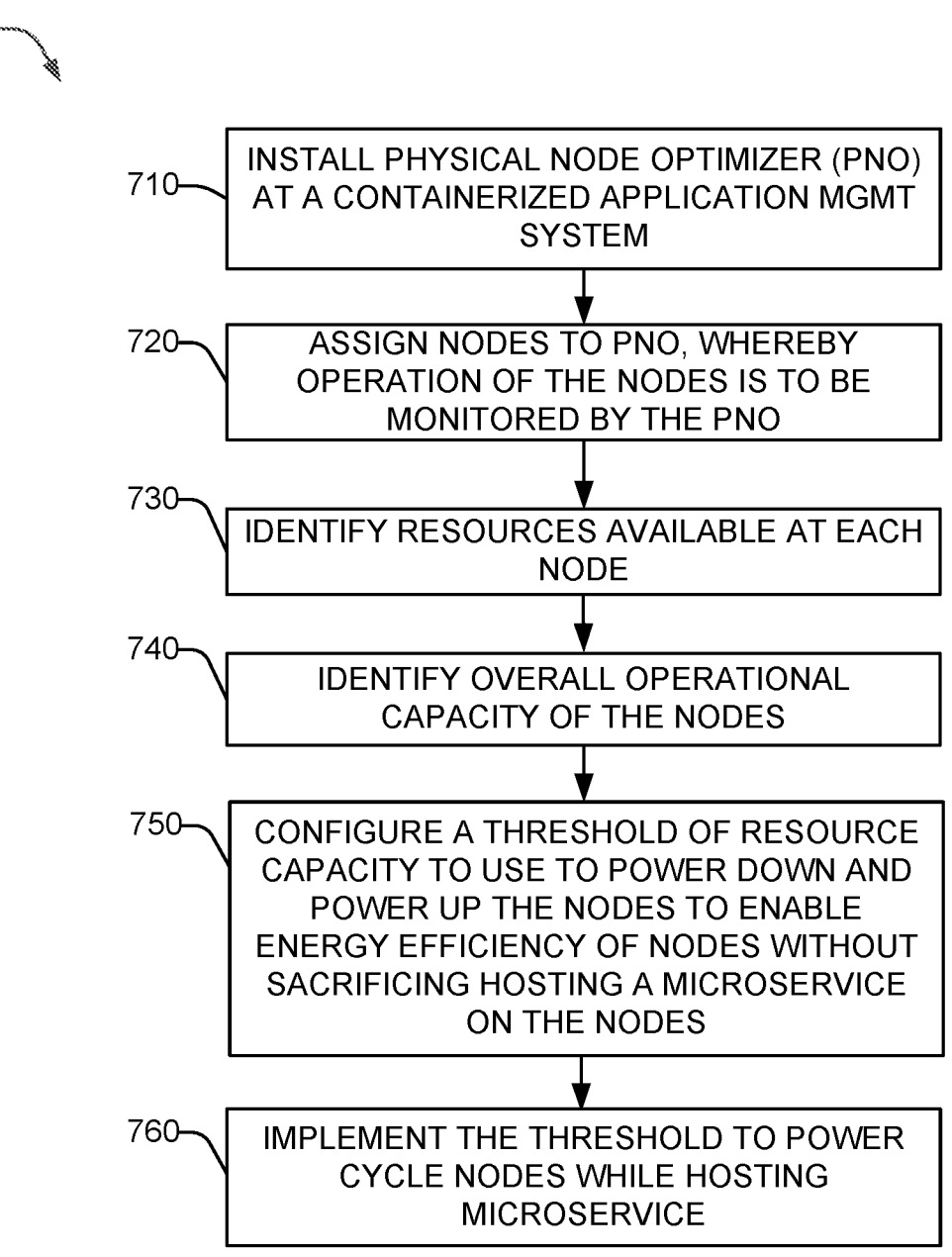

700

710 — INSTALL PHYSICAL NODE OPTIMIZER (PNO) AT A CONTAINERIZED APPLICATION MGMT SYSTEM

720 — ASSIGN NODES TO PNO, WHEREBY OPERATION OF THE NODES IS TO BE MONITORED BY THE PNO

730 — IDENTIFY RESOURCES AVAILABLE AT EACH NODE

740 — IDENTIFY OVERALL OPERATIONAL CAPACITY OF THE NODES

750 — CONFIGURE A THRESHOLD OF RESOURCE CAPACITY TO USE TO POWER DOWN AND POWER UP THE NODES TO ENABLE ENERGY EFFICIENCY OF NODES WITHOUT SACRIFICING HOSTING A MICROSERVICE ON THE NODES

760 — IMPLEMENT THE THRESHOLD TO POWER CYCLE NODES WHILE HOSTING MICROSERVICE

FIG. 7

810 — IDENTIFY A POWER COMPONENT AT EACH NODE IN A SET OF NODES

820 — ASSOCIATE POWER COMPONENT WITH RESPECTIVE BMC AT THE RESPECTIVE NODE IN THE SET OF NODES

830 — ASSIGN THE POWER COMPONENTS TO A PHYSICAL NODE OPTIMIZER COMPONENT

840 — CONTROL OPERATION OF NODES BASED ON INTERACTION BETWEEN RESPECTIVE NODE POWER COMPONENT AND THE PNO

PHYSICAL NODE OPTIMIZER IN A CONTAINERIZED APPLICATION MANAGEMENT SYSTEM

BACKGROUND

A recent approach to software application programming comprises building an application from a collection of containers (microservices) all working together, wherein each of the containers performs a particular function. Containers are combined to form a platform comprising physical or virtual hosts (servers). Hosts have containerized workloads (aka pods) operating thereon, with the hosts providing the workloads with the necessary processing, memory, and network resources required for a workload to execute and interact with other workloads operating across the platform. Operation of the platform of workloads is managed by a control plane, e.g., to upscale and downscale resources in response to the overall needs of the application. Such a containerized approach can be referred to as a containerized application management (CAM) system.

A CAM system can be a portable, extensible, open-source platform for managing containerized workloads and services, that facilitates both declarative configuration and automation. CAM systems are a large, rapidly growing ecosystem, with services, support, and tools being widely available. A CAM system cluster can include a variety of nodes, pods, etc., which can be utilized to deploy an application.

An application is a computer software package that performs a specific function for a customer (e.g., client, an end user, customer) or for another application based on carefully designed features. One or more applications such as web-application(s), caching application(s), and the like, can be deployed on a CAM system cluster.

The number of nodes, pods, etc., utilized by an application can increase or decrease as a function of the operational needs of the application scaling up or down. Physical servers remain operational to support the nodes, pods, etc. However, there may be periods of time, both predictable or random, where one or more nodes, pods, etc., have low levels of interaction/usage. Maintaining power to the servers during these low levels of usage is wasteful with regard to powering processors and memory architecture that is not being used, as well as powering cooling systems to cool the unused processors and memory architecture.

The above-described background is merely intended to provide a contextual overview of some current issues and is not intended to be exhaustive. Other contextual information may become further apparent upon review of the following detailed description.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. The sole purpose of the Summary is to present some concepts of the disclosure in a streamlined form as a prelude to the more detailed description that is presented later.

In one or more embodiments described herein, systems, devices, computer-implemented methods, methods, apparatus and/or computer program products are presented to facilitate reducing energy consumption of nodes deployed on an infrastructure of a containerized application management (CAM) system. Operational requirements (processing and memory) of one or more pods deployed on a set of nodes can be monitored to determine whether one or more nodes in the set of nodes can be powered down during a period of low resource requirement(s) by an application executing on the one or more nodes.

According to one or more embodiments, a system comprising a processor and a memory that stores executable instructions that, when executed by the processor, facilitate performance of operations, comprising monitoring at least one operational parameter of a first node having at least one first pod deployed thereon and a second node having at least one second pod deployed thereon, wherein the first node and the second node are included in a deployment of a containerized application management system. In another embodiment, the operations further comprise, based on the monitoring, determining a combined operation applicable to the first node and the second node, and identifying, based on the combined operation applicable to the first node and the second node, whether the first node and the second node are operating efficiently according to a defined efficiency metric. In an embodiment the monitoring of the at least one operational parameter of the first node and the second node can be performed according to a schedule defined prior to initiating the monitoring. In a further embodiment, the at least one operational parameter can comprise at least one of a first memory usage at the first node, a first processing capacity available at the first node, a second memory usage at the second node, or a second processing capacity available at the second node. In an embodiment, the first node and the second node can be physical nodes.

In another embodiment, the operations can further comprise populating a configuration data structure with the at least one operational parameter, wherein the configuration data structure can comprise a first identifier for the first node, wherein the first memory usage at the first node and the first processing capacity available at the first node populate a first time entry associated with the first identifier, and wherein the first time entry comprises a defined time at which the first memory usage at the first node and the first processing capacity available at the first node were determined, and a second identifier for the second node, wherein the second memory usage at the second node and the second processing capacity available at the second node populate a second time entry associated with the second identifier, and wherein the second time entry is the defined time corresponding to the first time entry of the first node.

In another embodiment, the operations can further comprise obtaining the at least one operational parameter at a specified time, and further supplementing, at the specified time, the configuration data structure with the at least one of a first supplemental memory usage at the first node, a first supplemental processing capacity available at the first node, a second supplemental memory usage at the second node, or a second supplemental processing capacity available at the second node as determined at the specified time.

In another embodiment, the combined operation is a first combined operation, wherein the configuration data structure is a configuration table, and the operations can further comprise analyzing entries of the configuration data structure to determine a pattern of use of the first node and the second node, and further, based on the pattern of use, predicting a time when a second combined operation applicable to the first node and the second node is below a threshold. In an embodiment, prior to the time, scheduling deployment of the at least one second pod to the first node, and powering down the second node.

In another embodiment, the operations can further comprise in response to determining that the combined operation applicable to the first node and the second node is below or equal to a first threshold, deploying the at least one second pod to the first node, and powering down the second node.

In a further embodiment, the operations can further comprise, monitoring at least one of a current memory usage at the first node or a processing capacity currently available at the first node, and in response to determining that at least one of the current memory usage at the first node is above a second threshold or the processing capacity currently available at the first node is above a third threshold, powering up the second node.

In another embodiment, the operations can further comprise, in further response to the determining that at least one of the current memory usage at the first node is above the second threshold or the processing capacity currently available at the first node is above the third threshold, deploying the at least one second pod on the second node.

According to one or more embodiments, a method is provided, wherein the method comprises determining, at a first time, by a device comprising a processor, whether resources available at a set of nodes exceed a resource requirement of an application executing via a set of pods deployed on the set of nodes included in a containerized application management system and in response to determining that the resources exceed the resource requirement of the application, redeploying, by the device, at least one pod in the set of pods from a first node to a second node, as a result of which no pods are operating on the first node, wherein the first node and the second node are included in the set of nodes, and further, powering down, by the device, the first node. In an embodiment, the resource requirement of the set of pods can comprise at least one of a processing capability to facilitate execution of the application via the set of pods or memory available to facilitate the execution of the application via the set of pods.

In a further embodiment, the method can further comprise determining, by the device at a second time, wherein the second time is subsequent to the first time, the resource requirement of the set of pods exceeds the available resources of the second node, powering up, by the device, the first node, and further redeploying, by the device, at least one pod in the set of pods from the second node to the first node, wherein the set of pods are serviced by first resources of the resources available at the first node and second resources of the resources available at the second node. In an embodiment, the first time and the second time are determined in accordance with a predefined schedule.

In another embodiment, the method can further comprise generating, by the device, an instruction to power down the first node, and transmitting, by the device, the instruction to the first node.

Further embodiments can include a computer program product stored on a non-transitory computer-readable medium and comprising machine-executable instructions, wherein when executed, the machine-executable instructions cause a processor to perform operations, comprising determining, at a first time, a first resource requirement of an application executing via a set of pods deployed on a set of nodes, wherein the set of pods is included in a containerized application management system, and determining, at a second time subsequent to the first time, a second resource requirement of the application executing via the set of pods deployed on the set of nodes. The operations can further comprise predicting, based on the first resource requirement and the second resource requirement, a third time at which at least one pod of pods deployed on a first node in the set of nodes is to be redeployed to a second node in the set of nodes, and in response to determining, as part of the predicting, that the first node does not have any pods deployed thereon, powering down the first node. In an embodiment, with the first node being powered down, at least one of the pods deployed on the first node is at least one first pod of first pods deployed on the first node, the operations can further comprise predicting, based on the first resource requirement and the second resource requirement, a fourth time at which to power up the first node, and in response to determining that the fourth time has occurred, powering up the first node and deploying at least one second pod of second pods deployed on the second node in the set of nodes to the first node, wherein the fourth time is subsequent to the third time. In an embodiment, the first resource requirement can comprise a first processing capability and a first memory availability to facilitate execution of the application via the set of pods at the first time, and the second resource requirement can comprise a second processing capability and a second memory availability to facilitate execution of the application via the set of pods at the second time.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 6 illustrates a methodology for defining (e.g., predefining) a time period at which to assess resource usage by one or more pods operating on one or more nodes, in accordance with one or more embodiments described herein.

FIG. 7 illustrates a methodology for utilizing a threshold to determine power cycling of a set of nodes based on a combined resource usage at the nodes, in accordance with one or more embodiments described herein.

DETAILED DESCRIPTION

Figure 1:
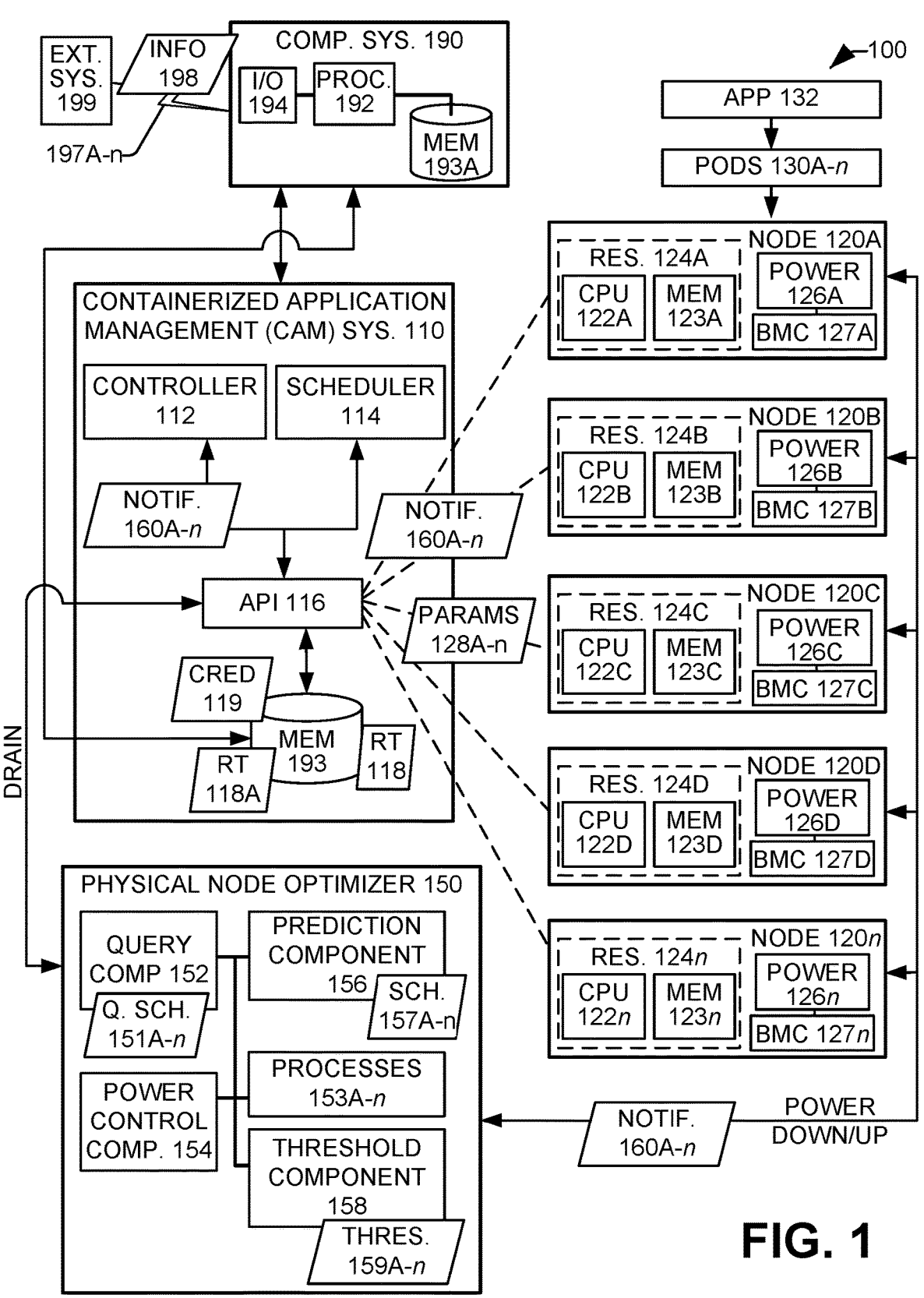
FIG. 1 presents a system comprising various components configured to monitor and/or control operation of one or more nodes coupled to a CAM system to enable reduction in energy usage, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is to be appreciated, however, that the various embodiments can be practiced without these specific details, e.g., without applying to any particular networked environment or standard. In other instances, well-known structures and devices are shown in block diagram form in order to facilitate describing the embodiments in additional detail.

As mentioned, an application can be deployed on a CAM system infrastructure, e.g., a CAM system cluster comprising nodes, pods, etc. While the containerized system is referred to herein as a CAM system, such systems can also be referred to as a container orchestration system; a container deployment, scaling and management system; a containerized application; an automated container management system; and the like. The various systems can be highly automated, such that during deployment and operation of an application across nodes and pods available on a CAM system, minimal human interaction with the CAM system is required. The various systems can be closed-source, proprietary software, as well as open-source software. Such systems and associated components available in the marketplace include AWS FARGATE®, AZURE CONTAINER INSTANCES®, GOOGLE CLOUD RUN®, KUBERNETES®, GOOGLE KUBERNETES ENGINE®, AMAZON ELASTIC KUBERNETES SERVICE®, AZURE KUBERNETES SERVICE®, OPEN SHIFT CONTAINER PLATFORM®, RANCHER®, DOCKER®, DOCKER SWARM®, NOMAD®, etc.

As mentioned, a CAM system operation can utilize multiple pods deployed on various physical servers/nodes. During a period of high interaction/utilization of the respective pods, the physical servers on which the pods are deployed can implement the required processors (e.g., central processing units (CPUs)) in conjunction with the necessary memory components. For example, a bank may have various applications deployed on a CAM system, whereby employee/customer interaction with the applications can be high during weekdays but low during the weekend and week nights. Conventionally, during the periods of low usage, the physical servers/nodes remain powered up (e.g., to power the CPUs, memory, cooling systems, and suchlike). However, keeping the servers powered up during periods of minimal application usage needlessly consumes energy, and given the size of the respective data centers, can be an expensive overhead. Accordingly, per the various embodiments presented herein, it is beneficial to identify the periods during which the respective pods, having the application deployed thereon, are undergoing low utilization, and during these periods, place the correspondingly minimally utilized servers in low power mode, e.g., powered off. Based on a determination that interaction with the applications is increasing once more, the servers can be powered back on to render available the respective CPUs and memory required to support the increased application usage and the pods requiring the increased usage.

During the periods where the nodes are placed in low power mode, pods can be consolidated onto a server that remains operational. For example, one or more pods initially deployed on a first server are re-deployed to a second server, wherein the first server is now freed up to be powered down while the second server remains operational with the one or more pods transferred from the first server in combination with whatever pods were already deployed on the second server. Subsequently, when interaction with the pods at the second server reaches a condition where the available CPU and memory on the second server start to become operationally pressured, the first server can be powered back on and one or more pods transferred from the second server to (a) reduce the operational pressure on the second server CPU and memory, and (b) enable the pods re-deployed to the first server to be served by the first server CPU and memory.

Per the various embodiments presented herein, by redeploying the pods during periods of low operational use, nodes/servers can be powered down, thereby reducing the power consumption of the nodes/servers when node/server usage is operationally low.

TERMINOLOGY: Various terms used herein, include:

CAM System Architecture: any component, system, device, etc., utilized by, or incorporated into a CAM system cluster, including a node, a pod, a container, a computer, a machine (virtual and/or physical), a containerized application, a storage device, a service device, and the like.

Application: any software program that can be deployed on a CAM system cluster and/or utilize a CAM system cluster, e.g., as a microservice.

Application Component: any component, device, etc., included in the CAM system architecture to be utilized by the Application. For example, a storage device, memory, disk drive, a CPU, processor, etc.

Cluster: a set of nodes (worker machines) that run a containerized application. A cluster has at least one node.

Control plane: The collection of processes that control the CAM system nodes.

Namespace: A virtual cluster, wherein a namespace provides a mechanism for isolating groups of resources within a single cluster. Namespaces allow a CAM system to manage multiple clusters (for multiple teams or projects) within the same physical cluster.

Nodes: machines/servers perform the requested tasks assigned by the control plane, e.g., host and execute the pods with available resources including processors and memory.

Pod: A set of one or more containers deployed to a single node, deployed from a first node to a second node, and suchlike. A pod is the smallest and simplest CAM system object, and can be referred to as a containerized workload.

It is to be appreciated that the various embodiments presented herein can be implemented automatically by one or more components and/or systems configured to perform the one or more operations, functions, etc., e.g., by one or more components included in the CAM system. Automated operations can include, for example, determining an operating condition of one or more nodes and the usage/availability of the processor(s) and memory, redeployment of pods on one or more nodes, powering down/up respective nodes, and the like.

As used herein, n is any positive integer.

Turning to the figures, FIG. 1 presents a system 100 comprising various components configured to monitor and/ or control operation of one or more nodes coupled to a CAM system to enable reduction in energy usage, in accordance with one or more embodiments described herein.

In an embodiment, CAM system 110 is communicatively coupled to a series of nodes 120A-n, wherein the term "node" is utilized herein to also denote a physical server, such that a node can remain on a physical server or bound to it. As further described, a collection of pods 130A-n can be deployed across the nodes 120A-n, wherein the pods 130A-n can be utilized to enable execution/operation of a user application 132. In a conventional configuration, the CAM system 110 monitors and/or controls operation of the nodes 120A-n, and the pods 130A-n deployed thereon. As shown in FIG. 1, the CAM system 110 can be further communicatively coupled to a physical node optimizer component (PNO) 150 which extends the ability of the CAM system 110 to control operation of the nodes 120A-n to conserve energy, e.g., when nodes 120A-n are being minimally utilized, as further described. In an embodiment, the PNO component 150 can be an application programming interface (API) component. The CAM system 110 and the PNO component 150 can be considered to be control plane components, while the nodes 120A-n and pods 130A-n can be considered to be data plane/worker node components. In an embodiment, the CAM system 110 can be defined with a first namespace, while the PNO component 150 can be defined with a second namespace, disparate from the first namespace. The CAM system 110, nodes 120A-n, pods 130A-n, and the PNO component 150 can combine to form architecture configured and communicatively coupled to create a CAM system cluster.

Respective deployment of the pods 130A-n on the various nodes 120A-n can be based on resource availability at the nodes 120A-n, wherein the resources can include one or more processors 122A-n and memory 123A-n available at the respective nodes 120A-n. The processors 122A-n and memory 123A-n available at each node 120A-n are collectively referenced herein as resources 124A-n.

As shown, each of the nodes 120A-n can further include a power component 126A-n configured to power up/down, power on/off, the respective node 120A-n from a powered state (powered up) to a dormant state (powered down), and vice-versa. The power component 126A-n can utilize a baseboard management controller (BMC) 127A-n local to each node 120A-n to enable controlling power to the respective node 120A-n. For example, the BMC 127A-n is a low-energy consuming component that can remain operational while a node 120A-n is powered down, and in response to a command (e.g., a notification 160A-n generated by the PNO component 150 or the power component 126A-n) the BMC 127A-n can be configured to bring the node 120A-n back online. In an embodiment, the power component 126A-n can be an API installed at the respective node 120A-n.

Example code of the power component 126A-n being called by the PNO component 150 is:

```
"https://<controlPlaneIp>/redfish/v1/Systems/437XR1138R2/Actions/
ComputerSystem.GracefulShutdown"
```

Example Code 1: Code to Call a Power Down Operation where, in the EXAMPLE CODE 1 presented, the power component 126A-n utilizes the REDFISH API protocol, however, it is to be appreciated that any applicable protocol can be utilized. In an embodiment, the power component 126A-n can be configured to separate protocol from a data model, making the data transport agnostic and protocol agnostic. As further described, the controlPlaneIp is a unique identifier defined for each of the nodes 120A-n, where, as mentioned, the respective node 120A-n remains on the same respective physical server or bound to it. By utilizing a unique identifier, respective operations (e.g., power up/down, redeploy pods 130A-n, and suchlike) can be directed to the pertinent node 120A-n.

Various actions can be supported at the power component 126A-n, for example:

"On" (e.g., turn on node 120A-n)

"ForceOff" (e.g., immediately power down the node 120A-n)

"GracefulShutdown" (e.g., a safe shutdown of the node 120A-n)

"GracefulRestart" (e.g., a safe restart of the node 120A-n)

"ForceRestart" (e.g., a restart of the node 120A-n)

"ForceOn" (e.g., immediately power up the node 120A-n)

"PushPowerButton" (e.g., turn node 120A-n on/off)

Ideally, when shutting down a node 120A-n, a GracefulShutdown is implemented, which provides sufficient time for operation of the respective pods 130A-n to be closed down in a controlled manner and redeployed as necessary. Further, it is preferred that when restarting a node 120A-n, an On state is implemented to enable the node 120A-n to be in condition for trouble-free redeployment of the respective pods 130A-n to the newly available nodes 120A-n.

The CAM system 110 can include a controller component 112 configured to control operation of the cluster of pods 130A-n to ensure, for example, the user application/microservice 132 supported by the pods 130A-n is maintained and operating/executing at a desired level.

The CAM system 110 can further include an API component 116 (e.g., an API aggregation layer) configured to interact with the controller component 112 to monitor operation of the nodes 120A-n, pods 130A-n, and resources 124A-n, in accordance with the operational needs of the controller component 112 regarding the functionality of the user application 132 being met. API component 116 can include one or more API components available to the controller component 112 to manage the cluster of pods 130A-n and resources 124A-n. The API component 116 can be an aggregation layer component configured to incorporate additional APIs beyond a core collection of APIs to enable the requirements of the user application 132 to be met. As previously mentioned, the PNO component 150 can be an API, wherein PNO component 150 can be registered with the API component 116 to extend the capabilities of the CAM system 110.

Interfacing the PNO component 150 with a node 120A-n can involve accessing the API service request URL (uniform resource locator) to enable and pass the Physical Server Control Plane IP of the respective node 120A-n which will be utilized by PNO component 150.

The following example code, EXAMPLE CODE 1, is an example Payload code for Enabling. Adding/Updating physical server details for a node 120A-n:

```
{
"controlPlaneIp": "xx.xx.xx.xx",
"node-name": "abc1"
"username": "abcd"
"password": "****"
}
```

Example Code 2: Physical Server Payload Code to Enable, Add, Update Physical Server Details In an embodiment, as part of configuring the PNO component 150, the respective Payload code regarding the physical node details controlPlaneIp and node-name (e.g., of nodes 120A-n) for which the PNO component 150 is to be applied are defined, e.g., for the node 120A-n which the PNO component 150 is going to monitor and potentially cause to be powered on/off.

In another embodiment, to facilitate interaction between the PNO component 150 and API component 116, and accordingly, the nodes 120A-n and pods 130A-n, various credentials 119 such as a username, password, credentials of nodes 120A-n, etc., (aka "secrets") can be stored at memory 193. In a further embodiment, the credentials 119 can be supplied to the CAM system 110 to enable respective nodes 120A-n to be identified for implementation with the PNO 150.

The CAM system 110 can further include a scheduler component 114 configured to control deployment of the respective pods 130A-n at the respective nodes 120A-n. The scheduler component 114 and the API component 116 can be configured to communicate with each other. In an embodiment, the scheduler component 114 can query the API component 116 to obtain information regarding the operational status of nodes 120A-n and pods 130A-n. In response to the query, the API component 116 provides the scheduler component 114 with the information regarding operational status of nodes 120A-n and pods 130A-n. Accordingly, the scheduler component 114 can be configured to utilize the information regarding operational status of nodes 120A-n and pods 130A-n to make decisions regarding where to place the respective pods 130A-n on nodes 120A-n. The scheduler component 114 can be further configured to instruct the API component 116 to deploy the pods 130A-n on the respective nodes 120A-n. For example, as part of the shutting down/turning on the nodes 120A-n, the scheduler component 114 can review the operational requirements of the pods 130A-n and deploy them (e.g., via the API component 116) across nodes 120A-n in accordance with the resources 124A-n available at the respective nodes 120A-n to service the respective needs of the pods 130A-n. In an embodiment, when the scheduler component 114 is determining whether to redeploy a subset of pods 130A-n from a first node 120A to a second node 120B, the scheduler component 114 is configured to determine that the redeployment still ensures that the pods 130A-n are still fully serviced by the resources 124A-n available on the second node 120B. Accordingly, the first node 120A is not freed of a subset of pods 130A-n if the subset of pods 130A-n cannot be fully serviced by the reduced number of nodes 120A-n.

In an embodiment, the API component 116 can be configured to monitor operation of the nodes 120A-n and the pods 130A-n. During operation of the nodes 120A-n, the API component 116 can obtain operational information regarding resources 124A-n, and store the information in a resource table 118 (e.g., an ETCD, a configuration data structure, configuration table, and suchlike). The resource table 118 can be utilized to store the operational data obtained from resources 124A-n at the respective nodes 120A-n. In an embodiment, the PNO component 150 can include a query component 152 configured to instruct (e.g., in a notification 160A-n), at a configured (preconfigured) time (e.g., query schedule 151A-n), the API component 116 to obtain resource data 128A-n (operational data) regarding the resources 124A-n operating on the respective nodes 120A-n, wherein the resource data 128A-n populates the resource table 118. Further, a copy of the resource table 118 can be stored in a resource table 118A at memory 193 for prediction analysis to be performed by a prediction component 156 included in the PNO component 150. In the event of the PNO component 150 being taken offline, reconfigured, etc., the PNO component 150 can be configured to, as a part of a re-implementation process, query (e.g., with the query component 152) resource table 118 to repopulate resource table 118A with the most recently obtained operational data 128A-n for resources 124A-n. In a further embodiment, the PNO component 150 can include a power control component 154 configured to control powering up/down of the nodes 120A-n. The power control component 154 can operate in conjunction with any of the power components 126A-n located at the one or more nodes 120A-n to enable the respective node 120A-n to be powered up/down, e.g., via a notification 160A-n generated and transmitted by the power control component 154 to the respective power component 126A-n.

The PNO component 150 can further include a threshold component 158 configured to compare parameter data 128A-n for resources 124A-n versus one or more thresholds 159A-n. The parameter data 128A-n can include processing capacity of the respective processors 122A-n and memory usage of the respective memory 123A-n comprising resources 124A-n at the respective nodes 120A-n. An operational threshold 159A (e.g., an efficiency metric) can be utilized by the PNO component 150 to determine when to power down/up respective nodes 120A-n. As mentioned, as the respective resources 124A-n become pressured, a potential exists that the pods 130A-n may not be efficiently serviced by the remaining CPU 122A-n and memory 123A-n capacity available at the subset of nodes 120A-n that remain powered up. The parameter data 128A-n can be utilized by the PNO component 150 to (i) determine current operating condition of the resources 124A-n regarding implementing pods 130A-n, (ii) determine when utilization of resources 124A-n is below the operational threshold 159A, enabling one or more nodes 120A-n to be powered down, (iii) in a scenario where a first subset of nodes 120A-n are currently powered down, determine when operating capacity of resources 124A-n available on a second subset of nodes 120A-n currently powered up and hosting the pods 130A-n is reaching/exceeds the operational threshold 159A and one or more of the nodes in the first subset of nodes 120A-n should be powered up to relieve the operational pressure on the second subset of nodes 120A-n. Thresholds 159A-n are arbitrary and can be set to any desired value to implement the various embodiments presented herein.

| TIME | NODE | CPU % | CPUC % | MEM % | MEMC % | CRC % (TOTAL/2) | H/L |
|------|------|-------|--------|-------|--------|------------------|-----|
| $T_1$ | 120A | 53 | | 35 | | | |
| $T_1$ | 120B | 47 | 50 | 37 | 36 | 86 = 43 | H |
| $T_2$ | 120A | 45 | | 25 | | | |
| $T_2$ | 120B | 31 | 38 | 29 | 27 | 65 = 32.5 | L |

-continued

| TIME | NODE | CPU % | CPUC % | MEM % | MEMC % | CRC % (TOTAL/2) | H/L |
|---|---|---|---|---|---|---|---|
| $T_3$ | 120A | | | | | | |
| $T_3$ | 120B | 30 | 38 | 38 | 36 | 74 = 37 | L |
| $T_4$ | 120A | | | | | | |
| $T_4$ | 120B | 43 | 41 | 46 | 43 | 84 = 42 | H |
| $T_x$ | 120A | 48 | | 37 | | | |
| $T_x$ | 120B | 54 | 51 | 35 | 36 | 87 = 43.5 | H |

Example Resource Table 118—% CPU and %
Memory Usage Compared with a Threshold (e.g.,
Threshold 159A)

The example resource table 118 above is presented to illustrate the concept of the % usage/capacity of respective resources 124A-n, such as CPU 122A-n and memory 123A-n being compared by PNO component 150 with the threshold 159A to determine deployment of the pods 130A-n to free up one or more nodes 120A-n or bring temporarily dormant nodes 120A-n back online. Resource table 118 presents five periods of time, $T_1 \rightarrow T_x$, at which the respective usage of resources 124A-n were obtained. As previously mentioned, the query component 152 can be configured to instruct (e.g., in notification 160A-n), at a preconfigured time (e.g., query schedule 151A-n), the API component 116 to obtain parameter data 128A-n regarding the resources 124A-n operating on the respective nodes 120A-n, wherein the parameter data 128A-n populates the resource table 118. In an embodiment, the preconfigured time coincides with times $T_1 \rightarrow T_x$ presented in resource table 118.

At $T_1$ CPU % use for CPU 122A is 53% of the available capacity, MEM % use of memory 123A is 35%, $T_1$ CPU % use for CPU 122B is 47% of the available capacity, MEM % use of memory 123B is 37%, with a combined CPUC % of 50% and a combined MEMC % use of 36%, giving a combined resource usage CRC % of 43%, which is above (High) a threshold 159A value of 40%, accordingly the PNO component 150 maintains operation of the nodes 120A-n. At a later time $T_2$, the combined resource usage drops to 32.5%, which is below (Low) the 40% threshold 159A value, and the PNO component 150/power control component 154 can issue a DRAIN notification 160A initiating the corresponding redeployment of pods 130A-n and power down of one or more nodes 120A-n. At time $T_3$, the node 120A is in a powered down state, hence, the contribution of CPU 122A to the available CPU resources is 0% and the contribution of memory 123A to the available MEM resources is also 0%. Accordingly, at time $T_3$ the pods 130A-n are only being serviced by CPU 122B and memory 123B, which have a combined resource usage of 37% which is below (Low) the threshold 159A value of 40%, the resources 124B are able to support execution of pods 130A. At time $T_4$, however, the combined resource use of CPU 122B and memory 123B rises to 42%, which is above (High) the threshold 159A of 40%, indicating that the pods 130A-n are applying pressure to the CPU 122B and memory 123B, and PNO component 150 should bring node 120A back online. The PNO component 150/power control component 154 can be configured to generate and transmit an ON notification 160B (e.g., to power component 126A-n) to turn on the one or more of the nodes in the subset of nodes 120A-n (e.g., node 120A) that are currently powered down to enable reduction of the operational pressure on the nodes 120A-n (e.g., node 120B) that are currently hosting pods 130A-n. At time $T_x$, with both nodes 120A and 120B operational, the combined resource usage of 43.5% is still greater (High) than the threshold value of 40%, the PNO component 150 can be configured to maintain operation of nodes 120A and 120B until the PNO component 150 determines that the combined resource usage drops below 40% once again. In the event that the combined resource usage drops below the 40% threshold once more, the PNO component 150/power control component 154 can generate and transmit a DRAIN notification 160A as previously described (e.g., per $T_2$ above).

Per the configuration presented in system 100, with the scheduler component 114 configured to move/deploy the pods 130A-n across the nodes 120A-n, a Hypervisor layer is not required between the nodes 120A-n and the pods 130A-n on the physical server, enabling improved application performance versus a Hypervisor-based system such as a virtual machine-based system, particularly for applications requiring intense utilization of computing resources 124A-n.

Example code for the retrieval of the parameter data 128A-n, whereby the PNO component 150 instructs the API component 116 to retrieve the parameter data 128A-n to populate the resource table 118/118A is:

kubectl get—raw "/apis/metrics.k8s.io/v1beta1/nodes"

Example Code 3: Code to Retrieve Parameter Data where, in the EXAMPLE CODE 3 presented, the PNO component 150 utilizes a KUBERNETES protocol, however, it is to be appreciated that any applicable protocol can be utilized.

As shown in FIG. 1, the CAM system 110 can include a computing system 190 comprising a processor 192 and a memory 193/193A, wherein the processor 192 can execute the various computer-executable components, functions, APIs, operations, etc., presented herein. The memory 193/193A can be utilized to store the various computer-executable components, APIs, functions, code, etc., as well as information regarding nodes 120A, processors 122A-n, memory 123A-n, resources 124A-n, status of power components 126A-n, deployment status of pods 130A-n, thresholds 159A-n, resource tables 118/118A, notifications 160A-n, and suchlike. As further shown, the computing system 190 can include an input/output (I/O) component 194 configured to enable transmission of information 198 (e.g., reports, notifications 160A-n, instructions, data 128A-n, and the like) between the CAM system 110 and a remote system 199. Further, the CAM system 110 can be located in a single datacenter, distributed across multiple datacenters, located in the "cloud" (e.g., a cloud-based analytics system, a cloud computing-based resource, and the like), an edge computing system, and the like. Information 198 can include notifications 160A-n, parameter data 128A-n, information populated/compiled in resource table 118/118A, thresholds 159A-n, and suchlike.

Figures 2A, 2B:
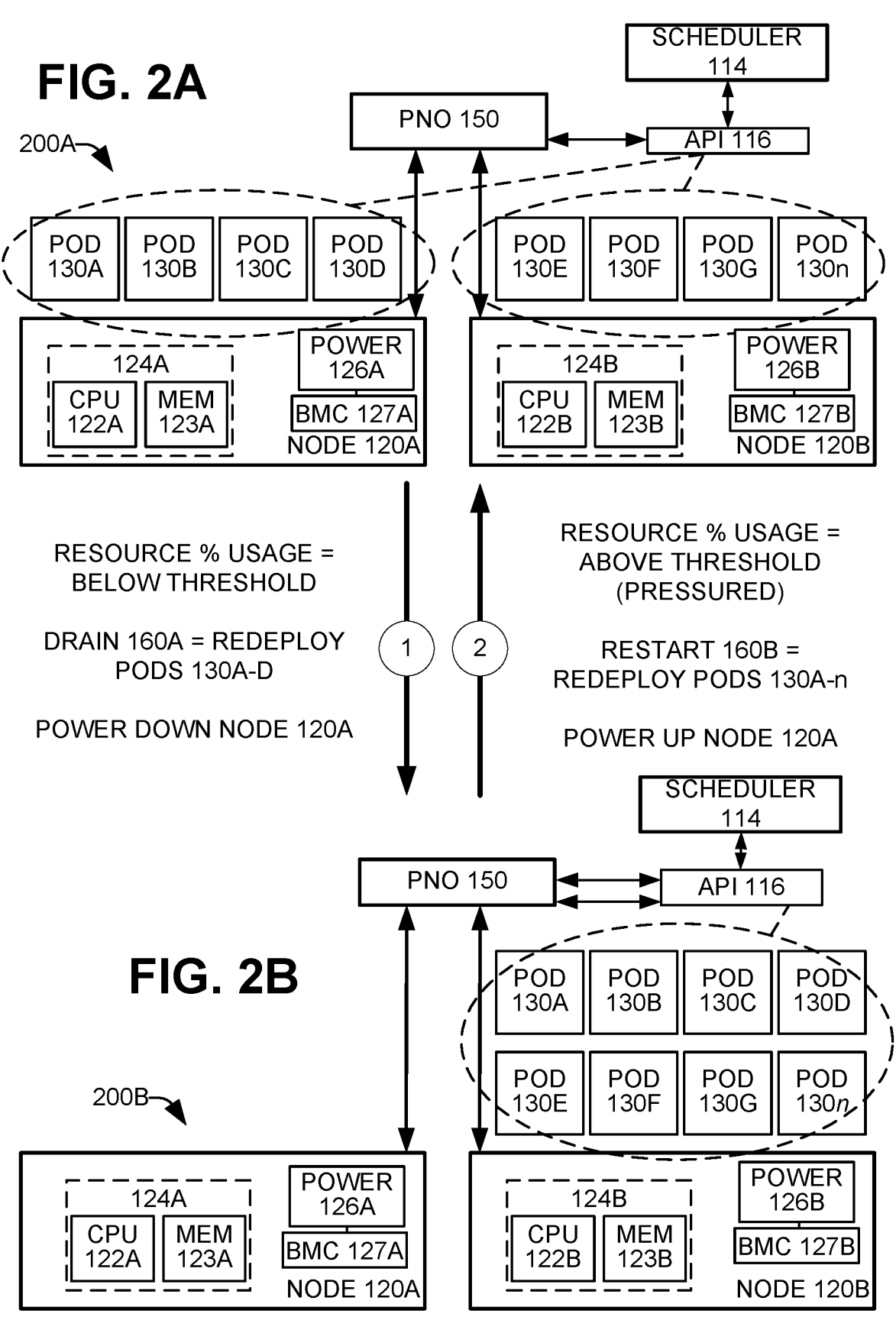
FIGS. 2A and 2B are schematics illustrating respective operations conducted during powering down of a node and subsequent powering up of the node with respective deployment of nodes, in accordance with an embodiment.

Turning to FIGS. 2A and 2B, schematics 200A and 200B illustrate respective operations conducted during powering down of a node and subsequent powering up of the node with respective deployment of nodes, in accordance with an embodiment. FIG. 2A presents a configuration of operation comprising a set of pods 130A-n, wherein a first subset of pods 130A-D have been deployed on a first node 120A and a second subset of pods 130E-n have been deployed on a second node 120B. While this is an initial position for the various embodiments presented herein, the configuration presented in FIG. 2A is a typical operational state of pods 130A-n deployed across a series of nodes 120A-n, whereby, no matter a current operational requirement of pods 130A-n on resources 124A-n, the nodes 120A-n remain fully operational at all times, and accordingly, CPUs 122A-n, memory 123A-n, cooling systems (not shown), and suchlike, are continually consuming power. For example, in a conventional system, the nodes 120A-n remain statically distributed.

In an embodiment, the PNO component 150 can determine, e.g., based on the utilization of respective resources 124A-n per parameter data 128A-n, whether a first set of pods 130A-D can be redeployed to the second node 120B. As previously mentioned, in the event that the combined operational requirements of the pods 130A-n drops below a resource threshold 159A (e.g., threshold 159A is configured at 40% of total resources 124A-n) the PNO component 150 can generate a DRAIN notification 160A to the scheduler component 114 (e.g., via the API component 116) to initiate redeployment of the pods 130A-n to a subset of the available nodes 120A-n, enabling one or more nodes 120A-n to be placed in a powered down mode. It is to be appreciated that while only two nodes 120A and 120B are presented in FIGS. 2A and 2B, the various embodiments relate to any number of nodes 120A-n where operation of one or more of the nodes 120A-n can be freed up to enable the one or more nodes 120A-n to be placed in an energy-saving dormant mode of operation. Further, the number of pods 130A-n respectively deployed and re-deployed on nodes 120A-n can be of any number.

In response to receiving the DRAIN command, the scheduler component 114 can redeploy (e.g., via the API component 116) the pods 130A-D from node 120A to node 120B, as shown in FIG. 2B. With the pods 130A-n deployed solely on node 120B, either of (a) scheduler component 114 can generate a node clear command/notification 160C (or suchlike) indicating to the PNO component 150 that node 120A no longer has any pods 130A-n deployed thereon, and node 120A can be powered down. In response to receiving the node clear command/notification 160C, PNO component 150 can generate and transmit a power down instruction/notification 160D to power component 126A indicating the power component 126A to execute a power down operation, placing node 120A in a dormant mode, consuming less power, as previously mentioned. Alternatively, (b) the PNO component 150 can receive a notification 160E from the API component 116 regarding no pods 130A-n are currently deployed on node 120A, with node 120A in condition to be powered down. In response to the indication 160E, the PNO 150 can instruct (e.g., with instruction 160D) power component 126A to place node 120A in a dormant mode, per the foregoing.

As further shown in FIG. 2B, and as previously mentioned, the application 132 serviced by the pods 130A-n may begin to undergo, for example, a level of user interaction that causes the pods 130A-n to pressure the available resources 124B at node 120B. A pressure threshold 159A-n (e.g., 40%)

can be implemented by the PNO component 150, such that as the current usage of processors 122B and/or memory 123B at node 120B by pods 130A-n meets or exceeds the pressure threshold, the PNO component 150 can initiate a restart of the node 120A.

Historical Data and Usage Prediction

Returning to FIG. 1, in an embodiment, rather than the PNO component 150 monitoring in real-time/near real-time utilization of the resources 124A-n at nodes 120A-n, usage history of the nodes 120A-n can be reviewed and a prediction of when the nodes 120A-n can be powered down/up can be made. As mentioned, the PNO component 150 can include a prediction component 156 configured to predict when the next power down/up event(s) should occur. In an embodiment, the prediction component 156 can review, in conjunction with processes 153A-n, the resource tables 118/118A to determine whether there is any discernible pattern to when resource usage at nodes 120A-n is low, normal, high, etc. Accordingly, the prediction component 156 can determine that pods 130A-n have a low level of usage of resources 124A-n at nodes 120A-n (e.g., CRC % is less than the threshold 159 % at weekends), while during the week, pods 130A-n consume a high level of resources 124A-n at nodes 120A-n (e.g., CRC % is greater than the threshold 159 % during the week). Accordingly, the PNO component 150 can redeploy pods 130A-n and power down one or more of the nodes 120A-n at weekends to reduce power consumption, while in the week, the PNO component 150 can power up a sufficient number of nodes 120A-n to ensure the resource requirements of the pods 130A-n is met. In an embodiment, the prediction component 156 can review usage of resources 124A-n over a series of times (e.g., at a first time, at a second time, etc.) and determine that one or mode nodes 120A-n can be powered down at a subsequent time (e.g., at a third time) and can be subsequently powered back up (e.g., at a fourth time), and so on.

As mentioned, the PNO component 150 can comprise various processes 153A-n respectively configured to determine information, make predictions, etc., regarding historical usage and future prediction of usage of resources 124A-n, the powering down/up of nodes 120A-n, and suchlike. The predictions can be utilized to create a schedule 157A-n identifying when the respective nodes 120A-n can be powered up, powered down, etc.

As mentioned, the query component 152 can be configured to instruct the API component 116 to obtain (e.g., in query schedule 151A-n) the parameter data 128A-n of the respective resources 124B and populate resource tables 118/118A with the parameter data 128A-n. Prediction component 156 and processes 153A-n can utilize the parameter data 128A-n as part of the prediction process. Processes 153A-n can include time series analysis and forecasting techniques to assist in the prediction process, such as exponential smoothing or autoregressive integrated moving average (ARIMA) modeling, wherein techniques such as determining the mean squared error can be conducted to enable assessment of the respective model to generate accurate predictions of usage and according power down/up events.

As used herein, the terms "predict", "infer", "inference", "determine", and suchlike, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In the various embodiments presented herein, the API component 116 can obtain parameter data 128A-n regarding the operation/usage of the CPU's 122A-n, memory 123A-n, and the powering down/up of nodes 120A-n, the parameter data 128A-n can be stored in the resource tables 118/118A for subsequent review by the PNO component 150 and any of the subcomponents 152, 156, 158. The processes 153A-n can include artificial intelligence, machine learning and reasoning techniques/technologies that employ probabilistic and/or statistical-based analysis to prognose or infer an action that a user desires to be automatically performed. The various embodiments presented herein can utilize various machine learning-based schemes for carrying out various aspects thereof, e.g., intelligent powering up/down of nodes 120A-n, as previously mentioned herein, can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence (class(x)). Such classification can employ a probabilistic and/or statistical-based analysis (e.g., factoring into the analysis utilities and costs) to prognose or infer an action that a user desires to be automatically performed (e.g., intelligent powering up/down of nodes 120A-n).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein is inclusive of statistical regression that is utilized to develop models of priority.

As will be readily appreciated from the subject specification, the various embodiments can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to predetermined criteria, e.g., historical and future usage of resources 124A-n, processors 122A-n and memory 123A-n.

As described supra, inferences can be made, and operations performed, based on numerous pieces of information. For example, information/data regarding usage of resources 124A-n, historical usage, predicted usage, etc., as operation of the nodes 120A-n continues, enabling analysis determine converging patterns such that inferences can be made regarding powering down/up of the nodes 120A-n.

Figure 3:
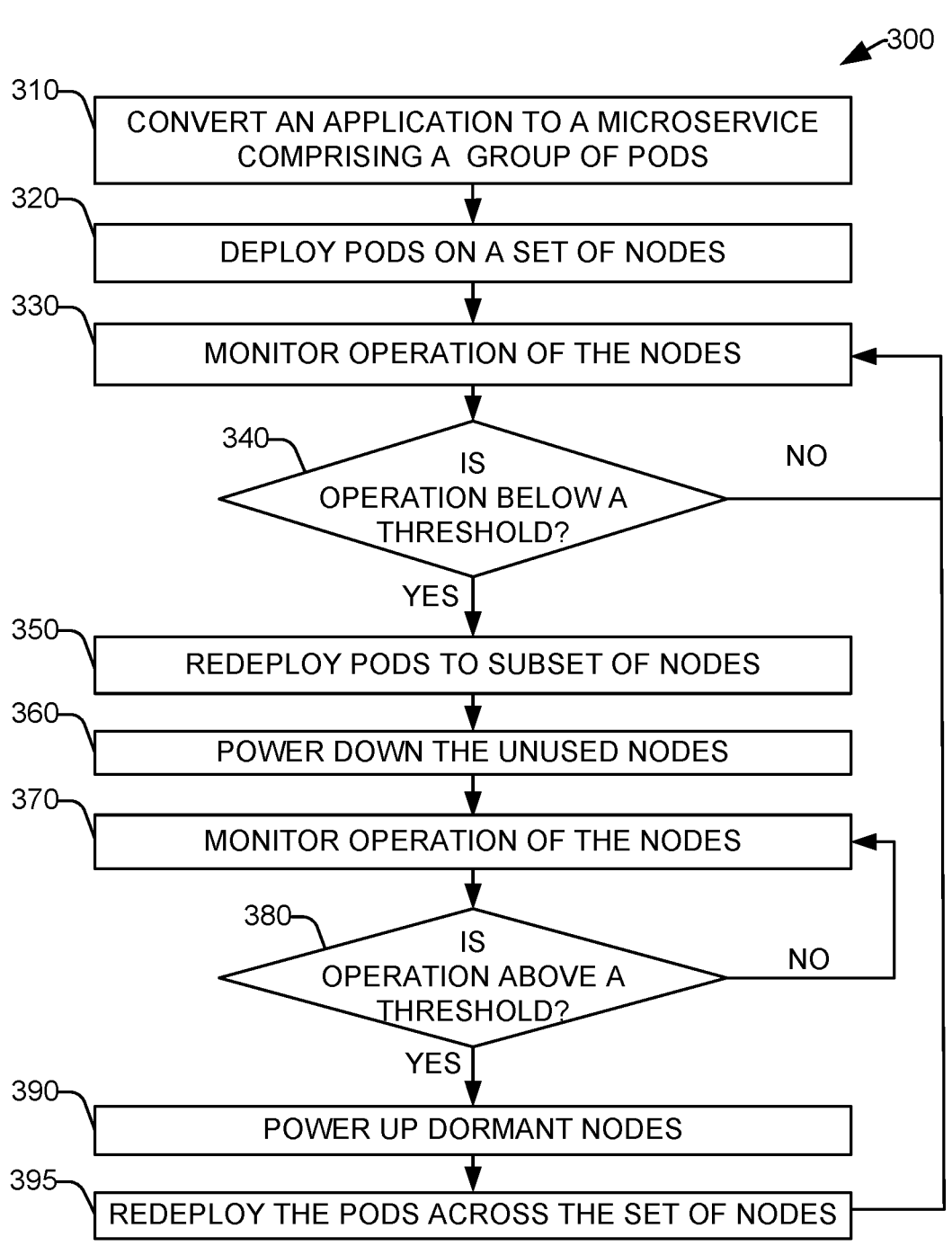
FIG. 3 illustrates a methodology for monitoring and controlling operation of one or more nodes coupled to a CAM system to enable reduction in energy usage, in accordance with one or more embodiments described herein.

FIG. 3 illustrates methodology 300 for monitoring and controlling operation of one or more nodes coupled to a CAM system to enable reduction in energy usage, in accordance with one or more embodiments described herein.

At 310, an application (e.g., application 132) is configured to be implemented/containerized on a group of pods (e.g., pods 130A-n), whereby the application can be implemented as a microservice hosted by/executing on the pods.

At 320, the pods are deployed on a set/group of nodes (e.g., nodes 120A-n), wherein a scheduler component (e.g., scheduler component 114) included in a CAM system (e.g., CAM system 110) can be configured to initially deploy (e.g., via the API component 116) the respective pods on respective nodes in the set/group of nodes (e.g., per FIG. 2A). To support operation of the pods located on each node, each node further includes one or more processors (e.g., CPUs 122A-n) and one or more memory devices (e.g., memory devices 123A-n). To ensure anticipated execution and operation of the microservice at the pods, the processing capability and available memory capacity (e.g., resources 124A-n) available at a node should always equal or exceed the amount of processing and memory capacity required by the pods to support the microservice.

At 330, operation of the nodes, and the resources respectively located thereon, can be monitored. Monitoring can be performed by a PNO component (PNO component 150) which can be configured to receive information (e.g., parameter data 128A-n) regarding resource usage by the pods, such as (i) a % of available processing capacity being utilized versus total processing capacity available, (ii) a % of a used processing capacity (CPU %) being utilized versus total processing capacity available, (iii) a % of available memory capacity versus total memory capacity available, (iv) a % of memory capacity being utilized (MEM %) versus total memory capacity available, and suchlike. To assess the operational state of the nodes, the respective CPU % determined for each node can be combined (CPUC %) and the respective MEM % determined for each node can be combined (MEM %). The CPUC % and MEM % can be expressed as an overall available resource % (CRC %). The PNO component can include a threshold component (e.g., threshold component 158), at which a resource threshold % (e.g., threshold 159A) can be defined, wherein the resource threshold % can be set to any arbitrary value. The CRC % can be compared with the resource threshold % to determine how pressured the available resources at the nodes are by operation of the pods located thereon. For example, the resource threshold % can be arbitrarily set to 40%. In an embodiment, the respective resource usage (e.g., in parameter data 128A-n) at each node can be obtained by an API component (e.g., API component 116) querying operation of the resources at the nodes, wherein the API component can be instructed to perform the query/review/analysis in response to an instruction (e.g., in notification 160A) generated by the PNO component. The respective resource usage % obtained by the API component can be stored in a resource table (e.g., in a resource table 118/118A).

At 340, a determination of operation of the resources at the nodes can be conducted, based on comparison of the CRC % versus the threshold %. The PNO component can further include a query component (e.g., query component 152) configured to query the respective values stored in the resource table (e.g., in query schedule 151A-n). In the event of the CRC % is greater than/exceeds the threshold %, the resources can be considered to be pressured and current operation of the nodes needs to be maintained and/or supplemented, e.g., the processing capacity and memory capacity available is limited. In the event of the CRC % is less than/equal to the threshold %, the resources are considered to not be pressured, and it is possible to put one or more nodes into standby mode to reduce the power consumption/ cost of running the nodes. Accordingly, in the event of NO, the resources are not below the threshold, methodology 300 can return to 330, whereby the resource availability can be further monitored.

At 340, in response to YES, excess resource capacity is available at the nodes, methodology 300 can advance to 350, whereby a subset of the pods can be redeployed to a subset of the nodes, thereby freeing up some of the nodes to be powered down. In an embodiment, the PNO component can generate and transmit a DRAIN command (e.g., in notification 160B) to the scheduler component (e.g., via the API component 116) instructing the scheduler component to redeploy various pods to free up one or more nodes to be powered down (e.g., per FIG. 2B). In response to receiving the DRAIN command, the scheduler component can redeploy a subset of pods to free up one or more nodes to be powered down.

At 350, upon completion of the pod redeployment, the PNO component can request and review node status information from the API component, wherein the API component can forward the current status of the nodes. The PNO component can identity the respective nodes (e.g., a subset of nodes in the set of nodes not having any pods operating thereon) being in condition to be powered down.

At 360, in response to determining the nodes are clear and in condition for shutdown, the PNO component can be further configured to generate and transmit a power down (GracefulShutdown) instruction (e.g., in notification 160D) to a node power component (e.g., power component 126A-n) controlling power operation of the node identified as being in condition to power down. In response to receiving the power down instruction, the node power component can power down the node (e.g., a subset of nodes in the set of available nodes).

At 370, the PNO component can continue to monitor operation of the nodes and the pods respectively operating thereon to determine whether a current level of operation of the pods is pressuring the processor and memory resources available at the nodes that have remained operational/powered up. As part of the monitoring operation, the PNO component can continue to apply the CRC % determined for current operation of the nodes against the threshold %.

At 380, a determination of operation of the resources at the nodes can be conducted, based on comparison of the CRC % versus the threshold %, e.g., as similarly performed at 330 and 340. In response to a determination that the CRC % does not exceed the threshold, e.g., the resource requirements of the pods is still supportable by the resources available with the currently operable nodes, methodology 300 can return to 370 for further monitoring of the nodes and pods.

At 380, in response to a determination that the CRC % is equal to, or greater than, the threshold %, methodology 300 can advance to 390, whereupon one or more of the dormant nodes can be powered back up. In an embodiment, the PNO component can generate and transmit a power up command (e.g., in a notification 166E) to the node power component respectively located on the one or more nodes that are currently in a dormant mode (e.g., the subset of nodes that are dormant in the set of available nodes). The respective node power component can power up the node, e.g., bring the node back online.

At 395, in response to the respective nodes being brought back online, the PNO component can further generate and transmit an instruction (e.g., in notification 160F) to the scheduler component instructing the scheduler component to redeploy the pods to enable the pods to be supported by the resources available at the operable nodes. Once the nodes are brought back online and the pods redeployed, methodology can return to 330 for a subsequent determination of when one or more nodes can be powered down to converse power in the future. It is to be appreciated that any number of nodes can be powered up/down to meet the resource requirements of the pods functioning across the set of nodes.

Figure 4:
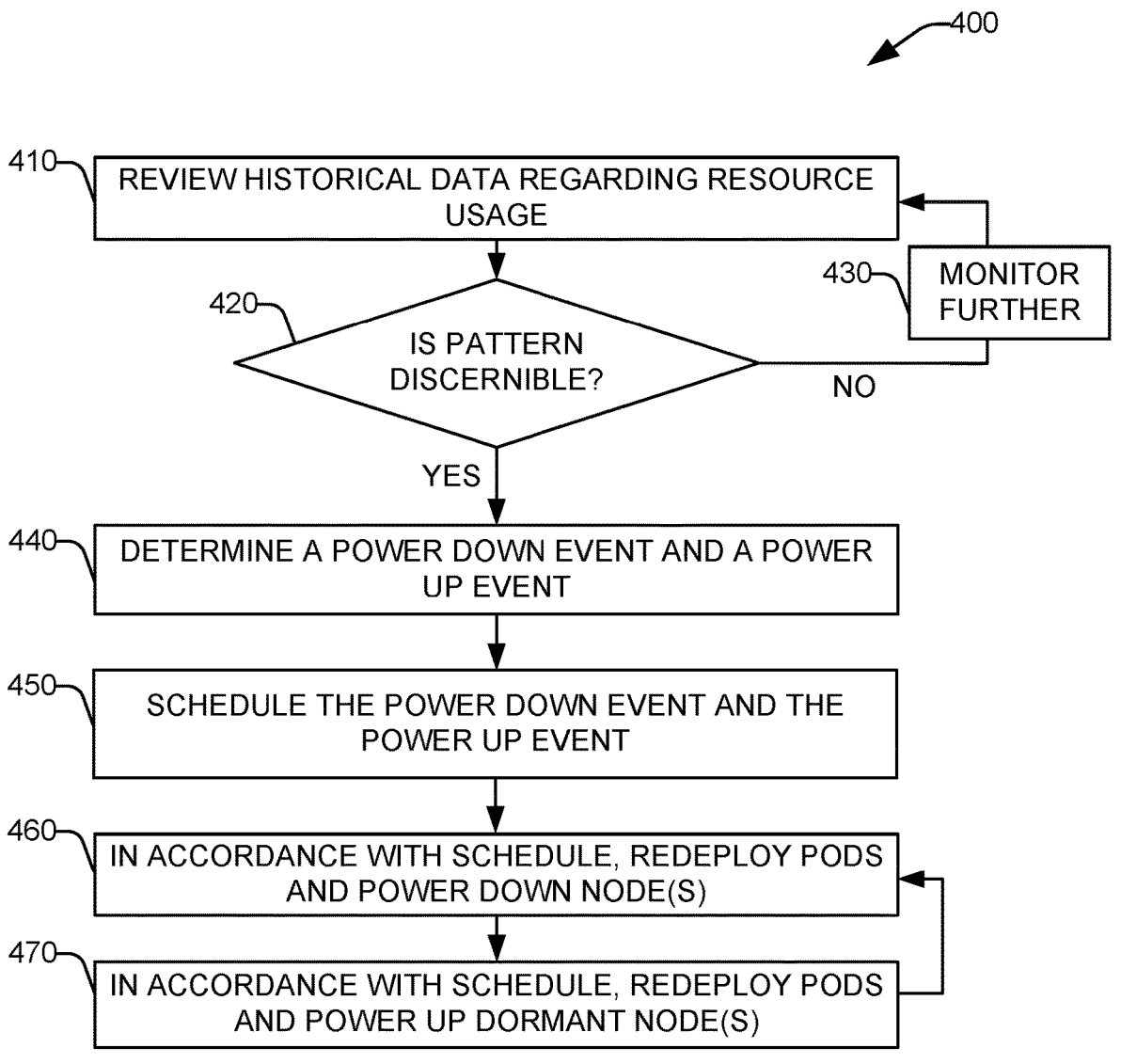
FIG. 4 illustrates a methodology for power cycling one or more nodes based on a predictive pattern of resource usage, in accordance with one or more embodiments described herein.

FIG. 4 illustrates methodology 400 for power cycling one or more nodes based on a predictive pattern of resource usage, in accordance with one or more embodiments described herein.

At 410, a PNO component (e.g., PNO component 150) can be configured to include a prediction component (e.g., prediction component 156). In an embodiment, the prediction component can be configured to review historical data (e.g., parameter data 128A-n) regarding usage of resources (e.g., resources 124A-n) by pods (e.g., pods 130A-n) respectively deployed and supported by a set of nodes (e.g., nodes 120A-n). Over a period of time (e.g., a first time, a second time, etc.), historical usage of the resources can be compiled (e.g., by API component 116) and stored in a resource table (e.g., resource table 118/118A). Review of the historical data in the resource table can be reviewed by the prediction component in conjunction with various processes, operations, functions, workflows, etc. (e.g., processes 153A-n) configured to determine/discern one or more resource usage patterns.

At 420, a determination can be made regarding whether it is possible to discern (e.g., by the prediction component 156 and processes 153A-n) a pattern of usage in the historical data to enable the PNO component to power down/up the respective nodes to reduce power consumption of the nodes. In response to a determination (e.g., by the prediction component) of NO, it is not possible to discern a pattern of resource usage, methodology 400 can advance to 430 for further monitoring to be conducted, and further resource usage data can be added to the resource table. Methodology 400 can return to 410 for further review of the historical data to be conducted in view of the new data added to the resource table.

Returning to 420, in response to a determination that YES, a pattern of resource usage is discernible, methodology 400 can advance to 440, whereby, based on the historical data of resource usage, the prediction component can determine respective node power down/up transitions to be implemented.

At 450, the prediction component can determine/configure a schedule (e.g., schedule 157A-n) for power cycling (e.g., at a third time, at a fourth time, etc., based on the first time, second time, etc.) the nodes with an associated redeployment of pods.

At 460, in accordance with the defined schedule, a scheduler component (e.g., scheduler component 114) can interact with the API component (e.g., API component 116) to redeploy a subset of the pods to respective nodes to free up a subset of nodes, as previously described. The subset of nodes that do not currently have any pods deployed thereon can be identified by the scheduler component in conjunction with the API component. The PNO component can be configured to instruct a power component (e.g., power component 126A-n) located at the respective node not having any pods deployed thereon to power down the node to conserve energy usage at the node(s) without pods deployed thereon.

At 470, at a subsequent time, in accordance with the defined schedule, the PNO component can instruct the scheduler component (e.g., in conjunction with the API component 116) to power up those nodes that are currently powered down, and further redeploy the pods across the powered nodes while ensuring that each of the pods is sufficiently serviced by resources (e.g., resources 124A-n) at the node on which the respective pod is deployed. As shown in FIG. 4, methodology 400 can return to step 460 to enable the one or more nodes to be powered down in accordance with the defined schedule.

Figure 5:
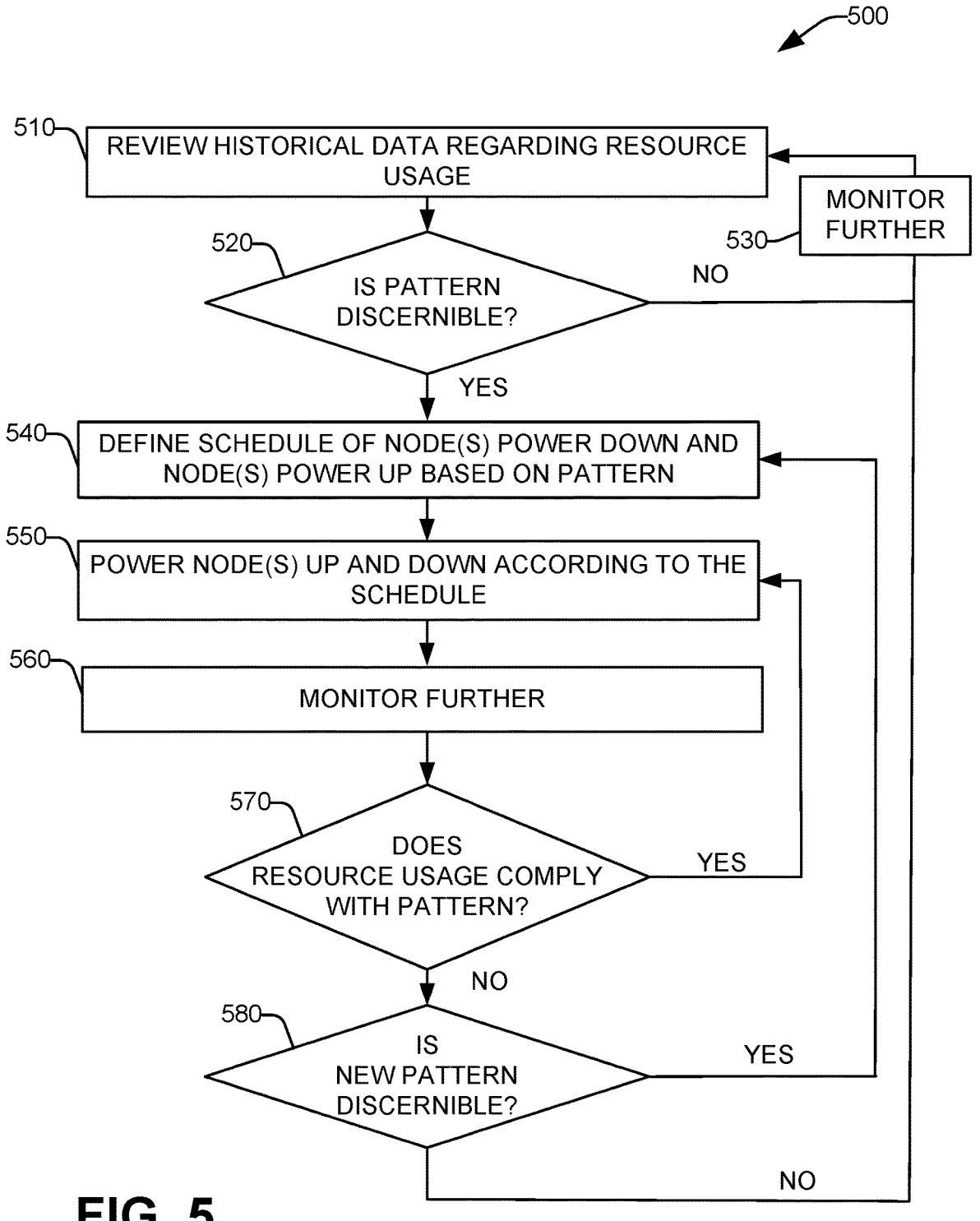
FIG. 5 illustrates a methodology for power cycling one or more nodes based on a predictive pattern of resource usage, in accordance with one or more embodiments described herein.

FIG. 5 illustrates methodology 500 for power cycling one or more nodes based on a predictive pattern of resource usage, in accordance with one or more embodiments described herein.

At 510, a PNO component (e.g., PNO component 150) can be configured to include a prediction component (e.g., prediction component 156). In an embodiment, the prediction component can be configured to review historical data (e.g., in parameter data 128A-n) regarding usage of resources (e.g., resources 124A-n) by pods (e.g., pods 130A-n) respectively deployed and supported by a set of nodes (e.g., nodes 120A-n). Over a period of time, usage of the resources can be compiled (e.g., by API component 116) and stored in a resource table (e.g., resource table 118/118A). Review of the historical data in the resource table can be reviewed by the prediction component in conjunction with various processes, operations, functions, workflows, etc. (e.g., processes 153A-n) configured to determine/discern one or more resource usage patterns.

At 520, a determination can be made regarding whether it is possible to discern a pattern of usage in the historical data to enable the PNO component to power down/up the respective nodes to reduce power consumption of the nodes. In response to a determination (e.g., by the prediction component) of NO, it is not possible to discern a pattern of resource usage, methodology 500 can advance to 530 for further monitoring to be conducted, and further resource usage data can be added to the resource table. Methodology 500 can return to 510 for further review of the historical data to be conducted in view of the new data added to the resource table.

Returning to 520, in response to a determination that YES, a pattern of resource usage is discernible, methodology 500 can advance to 540, whereby, based on the historical data of resource usage, the prediction component can determine a pattern of respective node power cycling occurred/occurring.

At 550, the prediction component can determine/configure a schedule (e.g., schedule 157A-n, power down one or more nodes at date/time x, power up one or more nodes at date/time y) for power cycling the nodes with an associated redeployment of pods. In accordance with the defined schedule, a scheduler component (e.g., scheduler component 114 in conjunction with API component 116) can redeploy a subset of the pods to respective nodes to free up a subset of nodes, as previously described. The subset of nodes that do not currently have any pods deployed thereon can be identified by the scheduler component in conjunction with the API component. The PNO component can be configured to instruct a power component (e.g., power component 126A-n) located at the respective node not having any pods deployed thereon to power down the node to conserve energy usage at the node(s) without pods deployed thereon.

Further, at a subsequent time, in accordance with the defined schedule, the PNO component can instruct the scheduler component to power up those nodes that are currently powered down, and further redeploy the pods across the powered nodes while ensuring that each of the pods is sufficiently serviced by resources (e.g., resources 124A-n) at the node on which the respective pod is deployed.

At 560, the operation of the nodes, power cycling of the nodes, deployment of the pods, resource usage, etc., can be further monitored, by the PNO component and the prediction component, with regard to the validity of the defined schedule regarding recent/current node and resource utilization. For example, (i) to determine whether the defined schedule is still valid in the event of an application/microservice (e.g., application 132) is no longer deployed on the nodes 120A-n, (ii) in the event of the resource consumption of the application (and associated pods) has increased, decreased, and suchlike.

At 570, a determination can be made by the PNO component and the prediction component, regarding whether the current resource usage (e.g., subsequent to the previously defined schedule) complies with the defined schedule. In response to a determination that YES, the defined schedule is still applicable to the current resource usage at the nodes, methodology 500 can return to 550 for the power cycling with associated pod deployment to be continued.

At 570, in response to a determination that NO, the defined schedule does not pertain to the current pattern of resource usage, methodology 500 can advance to 580 whereupon a determination can be made by the PNO component and the prediction component whether a subsequent pattern of resource can be detected/determined/discerned in the historical data. In response to NO, there is no recognizable pattern of resource usage at the nodes, the currently defined schedule can be abandoned and methodology returns to 530 for further monitoring of the resource usage to be performed.

At 580, in response to a determination by the PNO component and the prediction component that YES, a new pattern of resource usage can be discerned, the new pattern can be utilized as a basis for a new schedule to be defined (e.g., power down one or more nodes at date/time x, power up one or more nodes at date/time y), with methodology 500 returning to 540 for the newly defined schedule to be utilized.

FIG. 6 illustrates methodology 600 for defining (e.g., predefining) a time period at which to assess resource usage by one or more pods operating on one or more nodes, in accordance with one or more embodiments described herein.

At 610, a query component (e.g., query component 152) included in a PNO component (e.g., PNO component 150) can be configured with a time period/duration (e.g., query schedule 151A-n) with which to assess utilization of resources (e.g., resources 124A-n) by a set of pods (e.g., pods 130A-n) operating on a set of nodes (e.g., nodes 120A-n). The time period/query schedule can be of any arbitrary duration (e.g., user defined at the query component), such as every 10 minutes, 30 minutes, hour, etc., wherein the duration can be based on a duration that will detect a change in the utilization of the resources by the pods.

At 620, the PNO component (e.g., the query component included therein) can be configured to generate and transmit a request (e.g., notification 166A) to an API component (e.g., API component 116) to query the nodes to obtain a current resource usage by the pods located on the nodes.

At 630, the API component can populate a resource usage table (e.g., resource table 118/118A) with the respective resource usage identified for each node, e.g., memory usage at a first node, processor usage at the first node, memory usage at a second node, processor usage at the second node, etc., wherein resource table can be updated with the respective usage for a respective node at a given time.

At 640, the respective resource usage entries in the resource table can be utilized by the PNO component to determine power cycling of the nodes and corresponding pod redeployment to enable reduction in energy consumption of the nodes in supporting an application (e.g., application 132).

FIG. 7 illustrates methodology 700 for utilizing a threshold to determine power cycling of a set of nodes based on a combined resource usage at the nodes, in accordance with one or more embodiments described herein.

At 710, a PNO component (e.g., PNO component 150) can be installed/incorporated into a CAM system (e.g., CAM system 110). The CAM system can be utilized to monitor/control operation of pods (e.g., pods 130A-n) deployed across the set of nodes (e.g., nodes 120A-n).

At 720, the set of nodes can be assigned to the PNO component such that the PNO component can be configured to determine whether a subset of the nodes can be powered down/up to enable a reduction of power consumption of the set of nodes.

At 730, the respective resources (e.g., resources 124A) comprising processors (e.g., CPUs 122A-n) and memory (e.g., memory 123A-n) available at each node can be identified. In an embodiment, the CAM system can further include an API component (e.g., API component 116) configured to identify the resources available at each node.

At 740, the API component can be further configured to obtain data regarding the overall/total operational capacity (e.g., resource capacity) available at the nodes.

At 750, a threshold component (e.g., threshold component 158) can be included in the PNO component, whereby a threshold (e.g., threshold 159A-n) can be determined to control power cycling (e.g., power up/power down) of the nodes associated with the PNO component. In an embodiment, the threshold can be configured based on the resources available at each node, and further, the combined resources across the set of nodes, wherein the threshold can be set to enable energy efficient operation of the nodes without sacrificing implementation of an application (e.g., application 132) on the nodes, where, for example, the application is supported on the nodes via a set of pods (e.g., pods 130A-n) deployed on the nodes.

At 760, the threshold component can be configured to compare a current measure of resource usage across the nodes with the threshold, and based thereon, as previously described, the nodes can be powered down/up.

Figure 8:
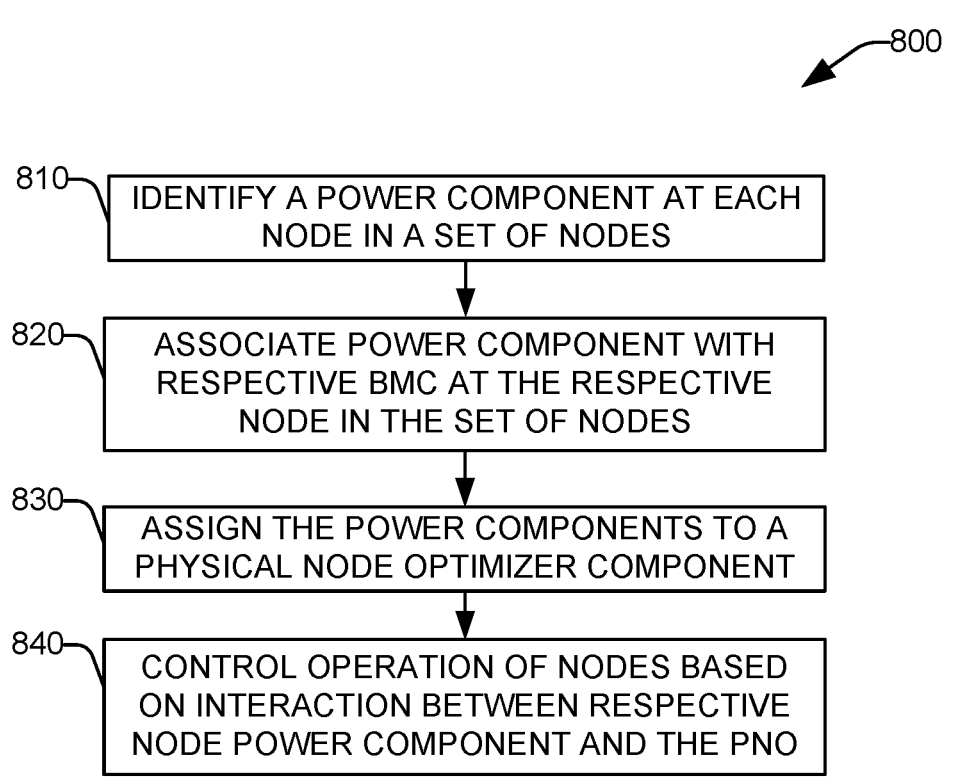
FIG. 8 illustrates a methodology for utilizing power components operating locally on a set of nodes to enable power cycling of the set of nodes, in accordance with one or more embodiments described herein.

FIG. 8 illustrates methodology 800 for utilizing power components operating locally on a set of nodes to enable power cycling of the set of nodes, in accordance with one or more embodiments described herein.

At 810, for each node (e.g., nodes 120A-n) included in a set of nodes, a power component (e.g., power component 126A-n) can be identified.

At 820, the respective power component located on a respective node can be associated with a BMC (e.g., BMC 127A-n) located on each node. The BMC can be utilized to power up a node that has been placed in a dormant mode.

At 830, the power components can be communicatively coupled to a PNO component (e.g., PNO component 150), wherein the PNO component can utilize the node power components to control power cycling of the respective nodes to which the power components are respectively installed.

At 840, the PNO component can be configured to control operation of the nodes based on generating and transmitting a first notification (e.g., notification 166A) to power down the node, and a second notification (e.g., notification 166B) to power up the node, as previously described.

Per the foregoing embodiments, various systems and techniques are presented to enable one or more nodes to be powered down during a period(s) of low resource utilization by the application/microservice via the collection of pods deployed on the nodes to support execution and operation of the application. The various components can be utilized to monitor the resource usage over time (e.g., at a defined time period) to determine whether the (a) available nodes should remain powered to provide resources to accommodate the needs of the pods or (b) a subset of the available nodes can be temporarily powered down when resource usage requirements are low (e.g., below a threshold value). As previously described, in scenario (b), as operation of the application increases with a corresponding increase in resource requirements of the pods (e.g., pods placing operational pressure on the resources), one or more of the nodes can be brought back online for pods to be redeployed to the one or more nodes.

Example Applications and Use

Figure 9:
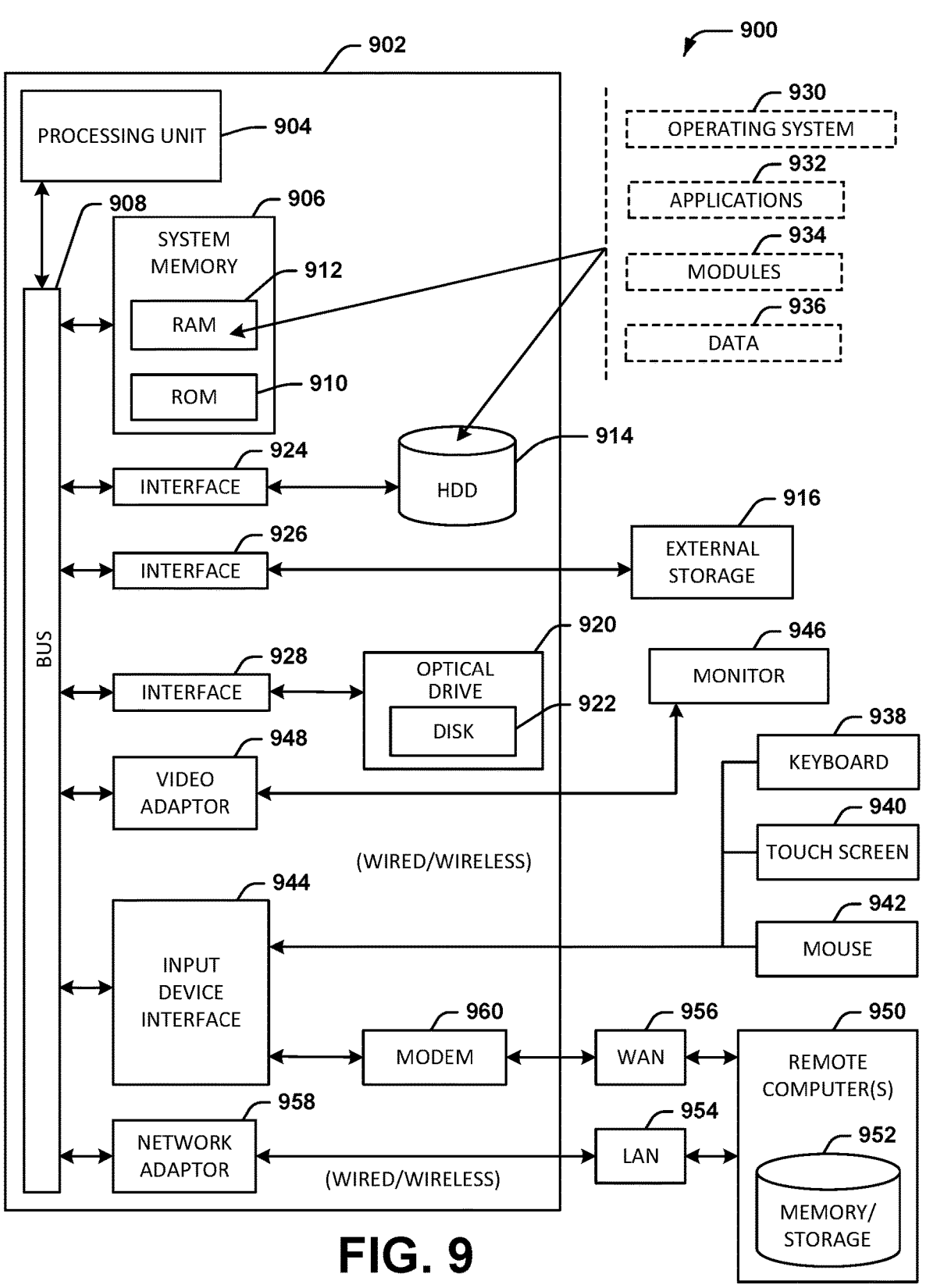
FIG. 9 illustrates a block diagram of an example computer operable to execute one or more embodiments presented herein.
Figure 10:
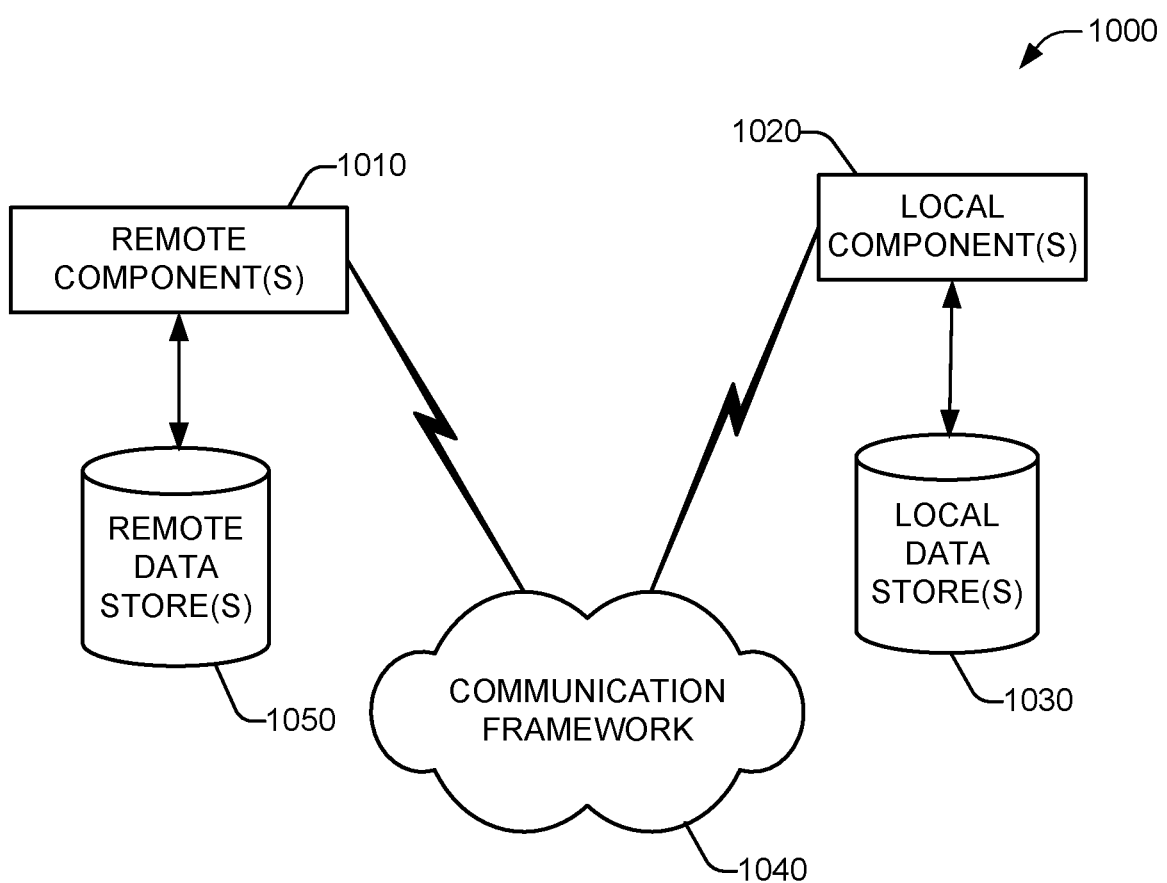
FIG. 10 is a block diagram representing an example computing environment into which aspects of the subject matter described herein may be incorporated.

Turning next to FIGS. 9 and 10, a detailed description is provided of additional context for the one or more embodiments described herein with FIGS. 1-8.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and nonremovable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors and may include a cache memory. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can comprise a security module, such as a trusted processing module (TPM). For instance with a TPM, boot components hash next in time boot components, and wait for a match of results to secured values, before loading a next boot component. This process can take place at any layer in the code execution stack of computer 902. e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1094 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Referring now to details of one or more elements illustrated at FIG. 10, an illustrative cloud computing environment 1000 is depicted. FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010 and 1020, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "consumer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor; and at least one memory that stores executable instructions that, when executed by the at least one processor, facilitate performance of operations, comprising:

monitoring a first operational parameter of a first node having a first set of resources comprising at least one first pod deployed thereon, wherein the first operational parameter relates to a first percentage utilization of a first resource in the first set of resources;

monitoring a second operational parameter of a second node having a second set of resources comprising at least one second pod deployed thereon, wherein the second operational parameter relates to a second percentage utilization of a second resource in the second set of resources, wherein the first node and the second node are included in a deployment of a containerized application management system;

based on the monitoring, determining operation of an application serviced by a combined operation of the first resource and the second resource operating in combination to service the application;

determining, based on the first percentage utilization of the first resource and the second percentage utilization of the second resource, an average percentage utilization for the first resource and the second resource;

determining, based on the average percentage utilization, whether the combination of the first node and the second node is operating efficiently according to a defined efficiency metric;

in response to determining that a combined implementation of the first set of resources at the first node and the second set of resources at the second node is at or below the defined efficiency metric, redeploying the at least one second pod in the second set of resources from the second node to the first node;

as a result of which no pods are operating on the second node, generating an instruction to power down the second node; and transmitting the instruction to a power controller located at the second node;

receiving a response indicating the second node has been powered down, as a result of which servicing of the application is performed by the first node, and powering down of the second node increases operational efficiency of the system in servicing the application.

2. The system of claim 1, wherein the monitoring of the first operational parameter of the first node and the second operational parameter of the second node is performed according to a schedule defined prior to initiating the monitoring.

3. The system of claim 1, wherein the first operational parameter comprises at least one of a first memory usage at the first node or a first processing capacity available at the first node, and wherein the second operational parameter comprises at least one of a second memory usage at the second node or a second processing capacity available at the second node.

4. The system of claim 3, wherein the operations further comprise populating a configuration data structure with the first operational parameter and the second operational parameter, and wherein the configuration data structure comprises:

a first identifier for the first node, wherein the first memory usage at the first node and the first processing capacity available at the first node populate a first-time entry associated with the first identifier, and wherein the first-time entry comprises a defined time at which the first memory usage at the first node and the first processing capacity available at the first node were determined; and a second identifier for the second node, wherein the second memory usage at the second node and the second processing capacity available at the second node populate a second time entry associated with the second identifier, and wherein the second time entry is the defined time corresponding to the first-time entry of the first node.

5. The system of claim 4, wherein the operations further comprise:

obtaining, at a specified time, at least one of the first operational parameter or the second operational parameter; and supplementing, at the specified time, the configuration data structure with at least one of a first supplemental memory usage at the first node, a first supplemental processing capacity available at the first node, a second supplemental memory usage at the second node, or a second supplemental processing capacity available at the second node as determined at the specified time.

6. The system of claim 5, wherein the combined operation is a first combined operation, wherein the configuration data structure is a configuration table, and wherein the operations further comprise:

analyzing entries of the configuration data structure to determine a pattern of use of the first node and the second node;

based on the pattern of use, predicting a time when a second combined operation applicable to the first node and the second node is going to be below a threshold; and prior to the time, scheduling deployment of the at least one second pod to the first node, and re-powering up the second node.

7. The system of claim 1, wherein the operations further comprise:

monitoring at least one of a current memory usage at the first node or a processing capacity currently available at the first node; and in response to determining that at least one of the current memory usage at the first node is above a first threshold pertaining to the defined efficiency metric or the processing capacity currently available at the first node is above a second threshold pertaining to the defined efficiency metric, re-powering up the second node.

8. The system of claim 7, wherein the operations further comprise, in further response to the determining that at least one of the current memory usage at the first node is above the first threshold or the processing capacity currently available at the first node is above the second threshold, deploying the at least one second pod on the second node.

9. The system of claim 1, wherein the first node and the second node are physical nodes.

10. A method, comprising:

monitoring, by a device comprising at least one processor, an operational parameter pertaining to combined operation of a first node and a second node, wherein a first group of resources comprising at least a first pod is deployed on the first node and a second group of resources comprising at least a second pod is deployed on the second node, wherein the first node and the second node are included in a containerized application management system, and wherein the operational parameter is representative of an average of a first current operational capacity of the first group of resources at the first node and a second current operational capacity of the second group of resources at the second node;

comparing, at a first time, by the device, the operational parameter with a defined resource requirement of an application executing via at least the first pod and at least the second pod, wherein the operational parameter pertains to the combination of the first group of resources and the second group of resources available at the combination of the first node and the second node;

determining, at the first time, by the device, whether the operational parameter exceeds the resource requirement of the application executing via at least the first pod and at least the second pod;

in response to determining that the operational parameter exceeds the resource requirement of the application, redeploying, by the device, at least the first pod in the first group of resources from the first node to the second node, as a result of which no pods are operating on the first node; and powering down, by the device, the first node.

11. The method of claim 10, further comprising:

determining, by the device at a second time, wherein the second time is subsequent to the first time, the resource requirement of the application exceeds the second group of resources available at the second node;

powering up, by the device, the first node; and redeploying, by the device, at least the first pod in the first group of resources from the second node to the first node, wherein the application is serviced by the first group of resources available at the first node and the second set of resources available at the second node.

12. The method of claim 11, wherein the first time and the second time are determined in accordance with a predefined schedule.

13. The method of claim 10, further comprising:

generating, by the device, an instruction to power down the first node; and transmitting, by the device, the instruction to the first node.

14. The method of claim 10, wherein the first node and the second node are physical nodes.

15. The method of claim 10, wherein the resource requirement comprises at least one of a processing capability to facilitate execution of the application via at least the first pod and at least the second pod or a memory available to facilitate the execution of the application via at least the first pod and at least the second pod.

16. A non-transitory machine-readable medium, comprising executable instructions that, when executed by at least one processor, facilitate performance of operations, the operations comprising:

determining, at a first time, a first resource requirement of all application serviced via a set of pods deployed on a set of nodes, wherein the set of pods is included in a containerized application management system, wherein the set of nodes comprises a first node and a second node, wherein a first pod in the set of pods is deployed on the first node, wherein a second pod in the set of pods is deployed on the second node, wherein the first pod and second pod operate in combination to serve the application, and wherein the determining comprises comparing the first resource requirement with a first average of resource capacity available at the first node and the second node;

determining, at a second time subsequent to the first time, a second resource requirement of the application executing via the set of pods deployed on the set of nodes, wherein the determining comprises comparing the second resource requirement with a second average of resource capacity available at the first node and the second node; and predicting, based on the first resource requirement and the second resource requirement, a third time at which:

the first pod deployed on the first node is to be redeployed to the second node, in response to that the first resource requirement or the second resource requirement will exceed the first average of resource capacity available at the first node and the second node or the second average of resource capacity available at the first node and the second node; and in response to determining, as part of the predicting, that the first node does not have any pods deployed thereon, powering down the first node.

17. The non-transitory machine-readable medium of claim 16, wherein the first node has been powered down, and wherein the operations further comprise:

predicting, based on the first resource requirement and the second resource requirement, a fourth time at which to power up the first node; and in response to determining that the fourth time has occurred, powering up the first node and deploying the first pod currently deployed on the second node to the first node, wherein the fourth time is subsequent to the third time.

18. The non-transitory machine-readable medium of claim 16, wherein:

the first resource requirement comprises a first processing capability and a first memory availability to facilitate execution of the application via the set of pods at the first time; and the second resource requirement comprises a second processing capability and a second memory availability to facilitate execution of the application via the set of pods at the second time.

19. The non-transitory machine-readable medium of claim 16, wherein the first node and the second node are physical nodes.

20. The system of claim 1, wherein the power controller is a baseboard management controller configured to control power applied to the first node.

\* \* \* \* \*